No. 738,718. PATENTED SEPT. 8, 1903.
L. FIEDLER.
GALVANIC CELL.
APPLICATION FILED DEC. 22, 1902.
NO MODEL.
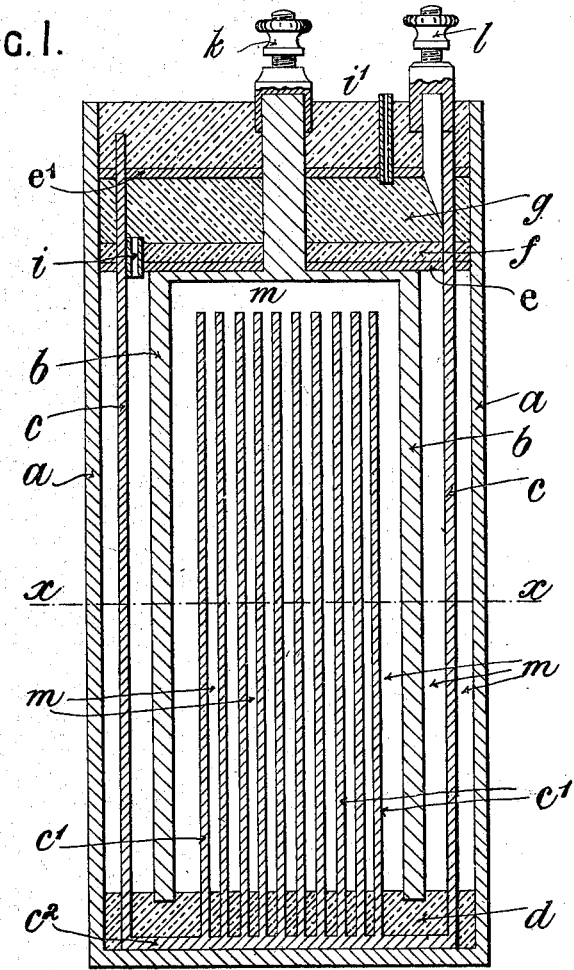
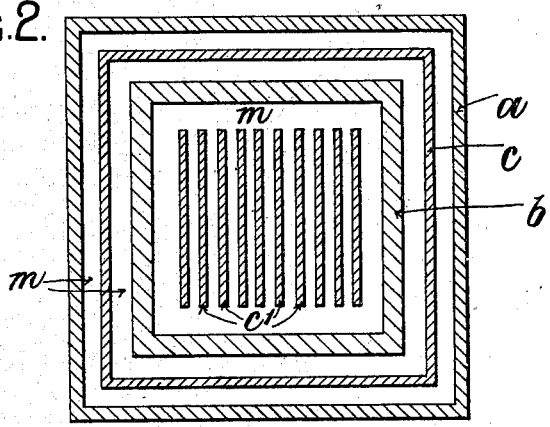
WITNESSES:
J. V. Symes.
Hedley James Harrop.
INVENTOR.
Lothar Fiedler
Per Robert E. Philips
Attorney.

No. 738,718. Patented September 8, 1903.

UNITED STATES PATENT OFFICE.

LOTHAR FIEDLER, OF LONDON, ENGLAND, ASSIGNOR OF ONE-HALF TO GEORGE PEARSON, OF PITFOUR, ILFORD, ENGLAND.

GALVANIC CELL.

SPECIFICATION forming part of Letters Patent No. 738,718, dated September 8, 1903.

Application filed December 22, 1902. Serial No. 136,281. (No model.)

*To all whom it may concern:*

Be it known that I, LOTHAR FIEDLER, a subject of the Emperor of Germany, residing at 71 Huntley street, Tottenham Court Road, London, in the county of Middlesex, England, have invented a new and useful Improvement in Galvanic Cells, of which the following is a specification.

The present invention relates to a new galvanic cell which according to its construction acts in the first instance as a primary cell and which after becoming exhausted can be regenerated or recharged in the same manner as a secondary cell.

The object of the present invention is to produce a cell which is cheaply and easily manufactured, is highly efficient and constant in action, and is, moreover, portable, the electrolyte being unspillable.

In the accompanying drawings, which illustrate by way of example one method of constructing a cell according to this invention, Figure 1 is a view in sectional elevation, and Fig. 2 is a view in section on line $xx$ of Fig. 1.

Similar letters refer to similar parts throughout both views.

The outer containing vessel $a$ is made of papier-mâché or other suitable non-conducting or insulating material and is adapted to contain the positive-pole electrode or element $b$, the negative-pole electrode or element $c$, and an electrolyte. The bottom of the vessel $a$ is furnished with a layer $d$ of bitumen, pitch, or like insulating material, which not only securely holds the electrodes or elements $b$ and $c$ in position, but also insulates them from one another. The top of the vessel is covered in after the electrolyte has been poured in, first, by a plate $e$, of pasteboard or the like, onto which is poured a layer $f$ of bitumen or other insulating compound. A layer $g$ of sawdust, rice-husks, or the like is placed over the layer $f$ and is covered in by a second plate $e'$, of pasteboard or the like, over which is formed the outer layer $h$ of bitumen or other insulating compound. A vent-pipe $i$ is provided, communicating between the inside of the cell and the gas-space or layer $g$ and a second vent-pipe $i'$ between the gas-space or layer $g$ and the atmosphere in order to allow of the escape of gases generated within the cell. The ends of the electrodes or elements or pieces connected thereto pass through the various layers and are provided with usual terminal-screws $k\ l$.

The positive-pole electrode or element $b$ consists of a rectangular tube surrounded on its outside by a similarly-shaped tube forming part of the negative-pole electrode or element $c$ and containing within it a series of plates $c'$, joined or connected at their lower edges to a plate $c^2$ in contact or made in one with the outer part of the said negative-pole electrode or element. The positive-pole electrode or element may be of carbon, but is preferably of lead and formed or covered on each of its sides with a coating of lead peroxid, ($PbO_2$,) or hydrated lead peroxid, ($H_2Pb_2O_5$.) This electrode or element is of the usual gridlike form and may be formed in the manner usually employed in the construction of positive-pole electrodes for the well-known types of secondary batteries.

The various parts of the negative-pole electrode or element are made of zinc, having an active surface produced by electrodeposition of cyanid zinc and mercury in the manner set forth in an application for patent filed concurrently with this present application.

The various spaces $m$ formed by and between the outer vessel $a$ and the various parts of the electrodes or elements—that is to say, the whole of the available interior space—are filled with an electrolyte compounded from the following ingredients in or about the proportions stated: of a solution of a density of 24° Baumé of sodium silicate, ($Na_2O4SiO_2$,) one thousand grams; of a solution having a density of 33° Baumé of sulfuric acid, ($H_2SO_4$,) three thousand grams, and of mercuric sulfate, ($HgSO_4$,) fifty grams. After this solution is compounded it is at once poured into the cell, and in a little time it solidifies into a jelly-like mass.

A cell constructed as hereinbefore described is immediately ready for use and has an electromotive force of about 2.5 volts, is extremely constant in action, has no local action on open circuit, and has a large capacity. It can be discharged till the electromotive force is 1.6 and be recharged from any suitable source of electricity in the same manner as the usual form of secondary cell.

Having now described my invention, what I claim, and desire to secure by Letters Patent, is—

1. A galvanic cell comprising a positive-pole electrode of lead peroxid, a negative-pole electrode of cyanid zinc and mercury and an electrolyte comprising sodium silicate, sulfuric acid and mercuric sulfate, as set forth.

2. A galvanic cell comprising a positive-pole electrode, of a rectangular tube-like form and having an active surface of lead peroxid, a negative-pole electrode, of a rectangular tube-like form surrounding the positive-pole electrode and in connection with a series of plates within the said electrode and having active surfaces of cyanid zinc and mercury, an electrolyte comprising sodium silicate, sulfuric acid and mercuric sulfate, and an outer vessel of insulating material adapted to contain the electrodes and electrolyte, as set forth.

3. A galvanic cell comprising a positive-pole electrode of a rectangular tube-like form and having an active surface of lead peroxid, a negative-pole electrode, of a rectangular tube-like form surrounding the positive-pole electrode and in connection with a series of plates within the said electrode and having active surfaces of cyanid zinc and mercury, an electrolyte comprising sodium silicate, sulfuric acid and mercuric sulfate, an outer vessel, of insulating material adapted to contain the electrodes and electrolyte, a layer of insulating material adapted to hold in position and insulate the electrodes from one another at their lower ends, two layers of insulating material separated from each other and forming a cover to the containing vessel, a gas-space formed between the two layers of insulating material and filled with a granular material and vent-pipes communicating from the inside of the cell to the gas-space and from the gas-space to the atmosphere, as set forth.

LOTHAR FIEDLER.

Witnesses:
A. MILLWARD FLACK,
G. V. SYMES.